UNITED STATES PATENT OFFICE.

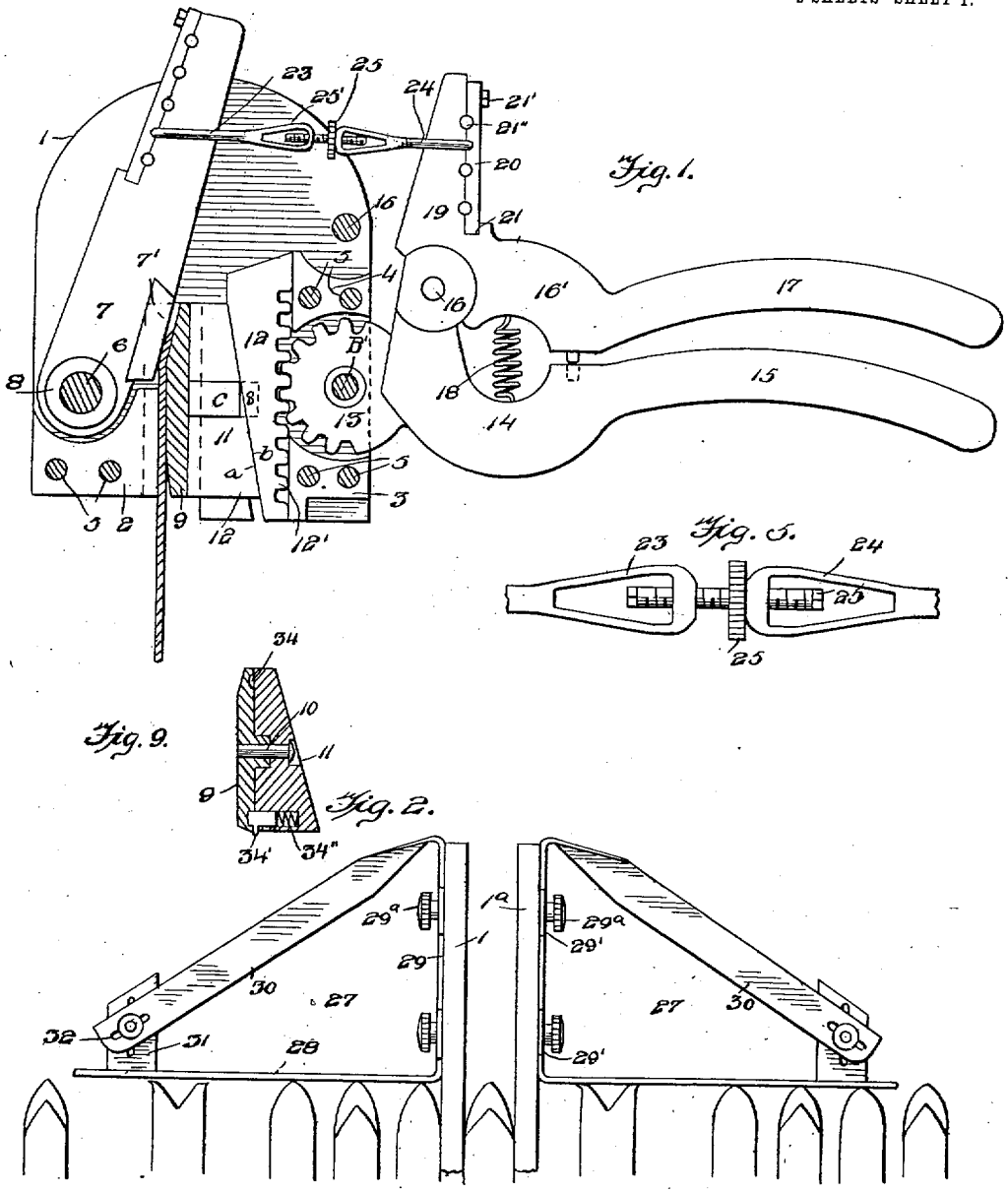

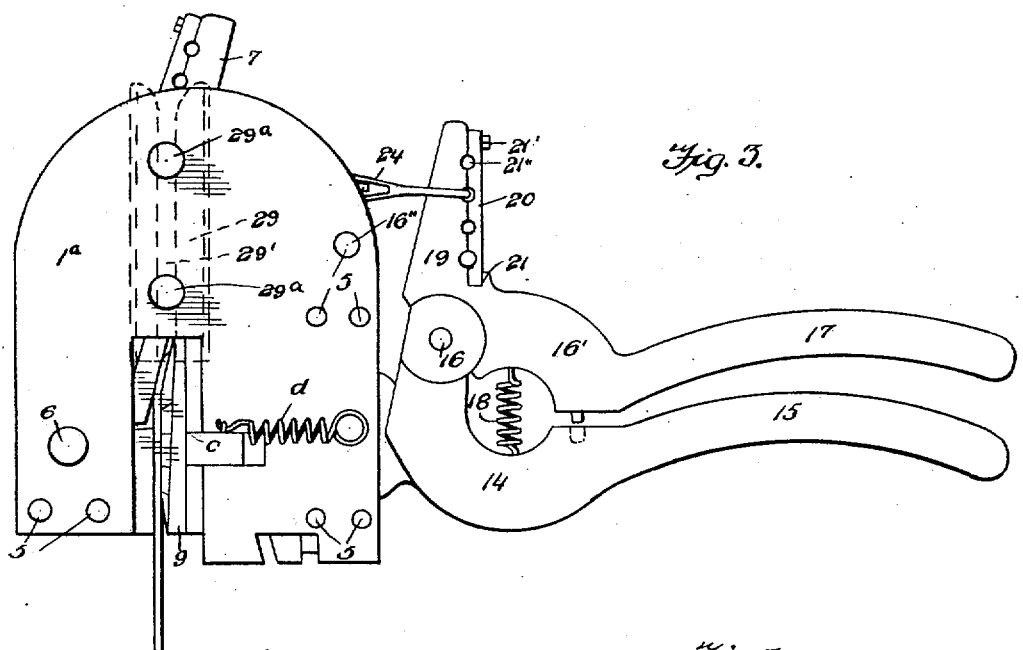
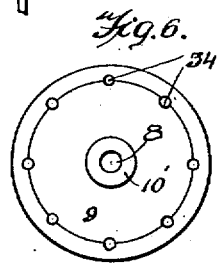
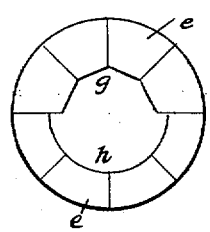
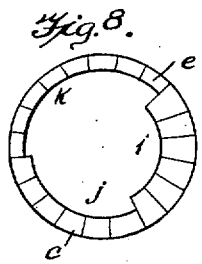
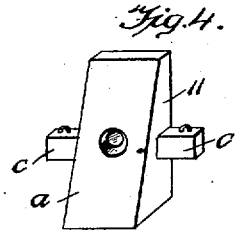

CHARLES L. JOHNSON, OF KANGLEY, WASHINGTON.

SAW-SETTING MACHINE.

1,017,761. Specification of Letters Patent. Patented Feb. 20, 1912.

Application filed August 7, 1907, Serial No. 387,491. Renewed July 17, 1911. Serial No. 639,063.

*To all whom it may concern:*

Be it known that I, CHARLES L. JOHNSON, a citizen of the United States, residing at Kangley, in the county of King and State of Washington, have invented certain new and useful Improvements in Saw-Setting Machines, of which the following is a specification, reference being had therein to the accompanying drawing.

My present invention relates to improvements in saw setting machines, and the main object of my invention, is the provision of a new and improved saw setting machine, which is adjustable, automatic, and positive in its action.

Another object of my invention, is the provision of a saw setting machine, which is provided with means which solidly and automatically clamps the saw tooth below the point of "set", and an auxiliary means to set the teeth and crush the grain of the steel, effectually preventing recoil; and as each tooth is acted similarly, every tooth is exactly alike and is set to the desired gage.

Another object of my invention, is the provision of a saw setting machine, which is not only applicable to light saws, but is powerful enough to set thick heavy saws, and is adjustable to fit different gages of saws and also to set different gages of sets of saws.

To accomplish these objects, I employ a rigid frame, in which is mounted a pair of co-acting levers, one of which actuates a clamping device, and also acts as a setting anvil, while the other actuates a saw setting lever, which sets the tooth, when the handles of the levers are pressed together. That is, the tooth of the saw to be set, while clamped by the anvil against the rigid frame, also the setting lever to bend the point of the tooth against the anvil, which limits the bend, but allows the grain of the steel to be crushed, so that when the tooth is released, the metal will not recoil, but will remain in the same shape, as was formed in the machine.

In order to clearly illustrate my invention, attention is invited to the accompanying drawings, in which:—

Figure 1 is a side elevation of the machine with one side of the frame removed to clearly illustrate the action of the machine upon a saw tooth. Fig. 2 is a front elevation of the frame of the machine and the adjustable trusses thereof in the position they assume when the machine is in operation. Fig. 3 is a side elevation of the complete machine, the truss upon one side being shown in dotted lines. Fig. 4 is a detail rear perspective view of the anvil back. Fig. 5 is a detail view of the turnbuckle adjuster. Figs. 6, 7, 8 and 9 are detail views of forms of adjustable anvil faces used in conjunction with anvil backs in my machine.

Referring to the drawings:—the numeral 1 designates one side of the frame and 1ª, designates the other side of the frame, which are separated and spaced apart by means of the blocks 2, 3 and 4, and may be cast together or held together by means of the rivets, tie bolts or screws 5.

Journaled upon the shaft 6, and the anti-friction washer or sleeve 8, is the setting lever or arm 7, which is provided with the removable saw engaging plate 7' of hardened steel. Adapted to receive the opposite side of the saw tooth, is the adjustable rotating anvil 9 of hardened steel and whose stud 10, is mounted in the anvil back 11, which is backed by the wedge block 12, (the whole being backed by the blocks 3 and 4) whose rack teeth 12', upon its rear face, are engaged by the toothed wheel 13, pivoted at B', within and between the sides of the frame. This wheel 13, is carried by the lever 14. When the handle 15, is pulled or compressed upwardly, the lever 14 and its wheel 13 cause the wedge block 12 to move downwardly and thus cause the movable anvil back or support 11 to move outwardly, the sliding of the inclined faces $a$ and $b$, causing the anvil to move outwardly, so that the tooth of the saw is solidly clamped between the anvil and the block 2, where the tooth is finally bent and crushed between the proper surface of the anvil face and the face plate 7'. To disengage the rack teeth, an outward pull of the lug $c$, will move the anvil therefrom.

Pivoted at 16, to the lever 14, or at 16'', to the frame 1 and 1ª, is the lever 16', provided with the handle 17, a spring 18, normally releasing the handles at the end of the setting operation. This release of the handles moves wedge block 12, upwardly and setting lever 7, backwardly, thus freeing the saw tooth.

The upward projection or arm 19, carried by the lever 16', is provided with an adjustable clamping plate 20, which is held securely to the arm, by means of the recess 21 and the bolt 21', the openings 21", formed thereby in conjunction with the arm, forming seats for one section 24 of the turnbuckle, while the lever 7, is provided with a similar device for the seating of the other section 23 of the turnbuckle, the sections or yokes being adjustably connected together by means of the adjusting screw 25', carrying the milled nut 25, these parts forming what I term my turnbuckle adjuster, clearly shown in Fig. 5. By means of this adjusting device, the lever 7 is connected to the lever 16', so that when the lever 16' is moved downwardly, the lever 7 is brought into engagament with the upper end of the saw tooth, and thus the desired projection of the tooth is bent upon the anvil surface, which already holds the body of the tooth in a vice, and allows the tooth to be set and crushed, so that when the handles are released, there will be no recoil in the metal of the bend.

As illustrated in Fig. 2, the sides 1 and 1ª, of the frame are each provided with the adjustable trusses 27, each of which consists of a strip of metal bent to form the adjustable base 28, the upright frame engaging strip 29, and the adjustable inclined brace 30, which is secured to the short lug 31, through the medium of the bolt and slot connection 32. The base 28, is easily adjusted to rest upon the tops of the teeth and rakers, as shown, and thus forms adjustable supports which carry the machine during the setting operation.

The anvil back 11, as illustrated in Fig. 4, has the inclined face $a$, and is provided with the oppositely extending lugs $c$, which are normally held by means of springs $d$ so that the face $a$ is held in close contact with the incline face $b$ of the wedge block 12. The lug $c$ moves, as shown, in the slots S formed in the frame's sides.

My rotatable anvil is clearly illustrated in Figs. 6, 7, 8 and 9. Upon the rear face, I provide a series of pointed openings 34, which determine what bevel $e$, is presented, a spring pin 34', having the spring 34", and mounted in the anvil back or support 11, being adapted to enter the desired opening 34, one at a time. By this means, the anvil may be rotated until the desired bevel $e$, is presented, when the spring actuated pin will lock the anvil against movement. The anvil is secured to the support 11, by means of the stud, rivet or screw 10, as clearly shown in Fig. 9.

The form of anvil face shown in Fig. 7, is specially adapted for setting teeth upon heavy cross-cut and circular saws, and is provided with two series of sets $g$, and $h$ of surfaces $e$; while in the anvil face, shown in Fig. 8, I provide three series of sets $i$, $j$ and $k$, which are especially adapted for use upon light and fine toothed saws.

In Fig. 9, I have illustrated a section through the anvil back carrying the adjustable anvil face, the anvil back 11, being provided with an opening therethrough for the reception of the stud 10, and with an enlarged bore for the circular boss 10', of the face 9. As above set forth, the spring actuated pins 34', hold the face in the desired adjustment. By this construction, the desired setting surface will be held stationary and presented, so that the tooth acted upon will be properly set.

From the foregoing description taken in connection with the drawings, the operation of my saw setting machine, is readily understood, but briefly stated it is as follows:—The machine is set as illustrated in Fig. 2, the tooth to be operated upon projecting between the sides of the frame, and up between the block 2, and the revoluble anvil face. By adjusting the vertical strips 29, through the medium of the slots 29', and the set screws 29ª, the desired projection of the saw tooth between the block 2 and the anvil face is regulated, and every tooth of the saw will then project the same distance, so that the proper and exact setting of each tooth is assured. At this point, the two handles 15 and 17, are grasped, first moving upwardly handle 15, and next downwardly handle 17, the anvil being moved outwardly. By this action, the saw tooth is clamped between the parallel faces of the anvil and the block or stationary jaw 2. The portion of the tooth to be "set" projects above the parallel faces, and as the setting lever 7, is moved toward the anvil, the plate 7', engages and bends the projecting portion of the tooth upon the "set" determining bevel of the anvil, and thus crushes the grain of the tooth at the bend and sets the tooth. At this point, the levers 15 and 17, are clasped tightly together, and the end of the tooth is bent at the desired angle, and the grains of the metal at the bend is crushed, so that when the handles are released, the spring 18 will separate the handles and release the great pressure exerted upon the tooth. By clamping the tooth as in a vice and crushing the grain of the steel at the bend, the recoil usually following the setting of the tooth is prevented, and thus each tooth is given a uniform bend or set, both as to angle and depth, thus insuring a uniform free running and clean cutting saw, which can not be so well obtained with other saw setting machines.

It will therefore be clearly understood, that I provide a saw setting machine, which can be operated upon any class of saw, and by means of the automatic stop adjustable rotatable anvils, the desired pitch, or any angle upon any class of saw can be readily given; and by reason of the great and even clamping strain that I attain by my construction, there is no danger of breaking the teeth during the setting operation, as the teeth is virtually secured within a vise, before final setting and crushing strain is placed upon the tooth. Furthermore, by my machine, I dispense with the blows and prying or pulling, thus not subjecting the teeth to any unnecessary strains.

What I claim as new, is:—

1. A saw setting device comprising a frame, relatively fixed and movable clamping jaws thereon, one of said jaws being provided with an anvil, a setting means supported on said frame for movement toward and from the said anvil, a pair of pivotally supported levers arranged to be simultaneously grasped and moved toward one another for operating said setting means and said movable clamping jaw, means connecting one of said levers with said setting means, and independent means for connecting the other lever with said movable jaw for operating the same.

2. A saw setting device comprising a frame provided with means for clamping a saw, tooth setting means on said frame, means for operating said clamping and setting means comprising a pair of levers each pivotally supported and connected, one with said clamping means and the other with said setting means for operating the same, said levers being arranged adjacent one another to be simultaneously grasped and swung toward one another to operate said clamping and setting means, and means yieldingly holding said levers apart.

3. A saw setting device including a frame, and means on which said frame is adjustably supported for movement independent thereof toward and from the saw teeth, said means including outwardly projecting flexible members adapted to be set to curved form, and means for holding said flexible members as set.

4. A saw setting device including a frame, means on which said frame is supported for movement toward and from the saw teeth, means securing said frame for adjustment on said first means, said first means including flexible base extensions adapted to be bent to curved form and engage on the points of the teeth, and means adjustably connected with said extensions for holding them as bent.

5. In a saw setting device a frame, clamping jaws thereon one of which is slidably supported for movement toward and from the other, resilient means connected with said last named jaw for retracting the same, and means for sliding said last named jaw comprising a toothed wedge shaped member supported for movement at an angle to said movable jaw, and a rotatably supported toothed means journaled on said frame in mesh with the teeth of said wedge shaped member.

6. A saw setting device comprising a frame, a saw clamping means thereon including an anvil member, a movable means arranged to act with said anvil member to set the teeth, and two pivotally connected levers and connected one to said movable means and the other to said saw clamping means and being arranged to be simultaneously grasped and moved toward one another to operate the said movable means and the anvil member of said saw clamping means.

7. In a saw setting device, a frame, clamping jaws thereon one of which is slidably supported for movement toward and from the other, and means for sliding said last named jaw comprising a toothed wedge shaped member supported on said frame for sliding at an angle to said movable jaw and having its inclined face engaging a correspondingly inclined face thereof, and a toothed member supported on said frame for rotation and held against movement with said movable clamping jaw, said toothed member being in mesh with the teeth of said wedge shaped member.

In testimony whereof I affix my signature in presence of two witnesses.

CHARLES L. JOHNSON.

Witnesses:
LOUELLA RAMAGE,
EARL SHOUP.